United States Patent
Kani et al.

(10) Patent No.: US 9,855,614 B2
(45) Date of Patent: Jan. 2, 2018

(54) JIGSAW

(71) Applicant: MAKITA CORPORATION, Anjo-Shi (JP)

(72) Inventors: Toshiyuki Kani, Anjo (JP); Fumihide Sugita, Anjo (JP); Kenji Abe, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 393 days.

(21) Appl. No.: 14/309,323

(22) Filed: Jun. 19, 2014

(65) Prior Publication Data

US 2014/0373366 A1 Dec. 25, 2014

(30) Foreign Application Priority Data

Jun. 20, 2013 (JP) .................................. 2013-129776
Apr. 9, 2014 (JP) .................................. 2014-080183

(51) Int. Cl.
*B23D 49/16* (2006.01)
*B23D 51/02* (2006.01)

(52) U.S. Cl.
CPC ........... *B23D 49/162* (2013.01); *B23D 51/02* (2013.01)

(58) Field of Classification Search
CPC .... B23D 49/162; B23D 49/16; B23D 49/007; B23D 51/02; B23D 51/025
USPC .................................................. 30/371–376
See application file for complete search history.

(56) References Cited

U.S. PATENT DOCUMENTS

| | | | | |
|---|---|---|---|---|
| 2,841,993 A | * | 7/1958 | Kaufmann | B23D 49/162 74/50 |
| 3,938,251 A | * | 2/1976 | Kareman | B23D 49/167 30/124 |
| 4,051,597 A | * | 10/1977 | Cardoza | B23D 49/162 30/373 |
| 4,442,878 A | | 4/1984 | Moriguchi et al. | |
| 4,665,617 A | | 5/1987 | Maier et al. | |
| 5,957,765 A | * | 9/1999 | Kimbel | B23D 67/06 451/356 |
| 6,553,675 B2 | * | 4/2003 | Orrico | B23D 49/167 30/376 |

(Continued)

FOREIGN PATENT DOCUMENTS

| CN | 1487865 A | 4/2004 |
|---|---|---|
| CN | 102000879 A | 4/2011 |

(Continued)

OTHER PUBLICATIONS

Office Action from related German patent application 10 2014 008 653.4 and partial English translation.

(Continued)

*Primary Examiner* — Phong Nguyen
(74) *Attorney, Agent, or Firm* — J-Tek Law PLLC; Jeffrey D. Tekanic; Scott T. Wakeman (57) ABSTRACT

A jigsaw includes a main body having a grasping part configured to be grasped by a user, a blade projecting downwardly from a front part of the main body and configured to reciprocate up and down, and a base coupled to a lower part of the main body and configured to make contact with a workpiece. A rear end of a contact surface that is configured to make contact with the workpiece is located at a position that coincides with or is rearward of the rear end of the grasping part.

14 Claims, 7 Drawing Sheets

(56) References Cited

U.S. PATENT DOCUMENTS

| | | | | |
|---|---|---|---|---|
| 6,705,017 B2* | 3/2004 | Ellis | ...................... | B23D 49/167 30/375 |
| 2002/0095798 A1 | 7/2002 | Ellis et al. | | |
| 2005/0229408 A1* | 10/2005 | Ngan | .................... | B23D 49/167 30/376 |
| 2006/0156887 A1* | 7/2006 | Hutchings | ............ | B23D 47/126 83/581 |
| 2006/0260140 A1* | 11/2006 | Saegesser | ............ | B23D 49/167 30/392 |
| 2010/0229404 A1 | 9/2010 | Schadow et al. | | |
| 2012/0192440 A1* | 8/2012 | Jerabek | ................ | B23D 49/165 30/393 |
| 2013/0145632 A1* | 6/2013 | Ni | .......................... | B27B 19/09 30/374 |

FOREIGN PATENT DOCUMENTS

| | | | |
|---|---|---|---|
| CN | 102275013 A | 12/2011 | |
| DE | 3130686 C2 | 6/1985 | |
| DE | 8410276 U1 | 8/1985 | |
| DE | 3447933 C2 | 12/1987 | |
| DE | 9307337 U | 7/1993 | |
| DE | 69933741 | 10/2007 | |
| DE | 102012009270 A1 | 11/2012 | |
| EP | 0985481 A2 | 3/2000 | |
| EP | 0985481 A3 | 10/2001 | |
| JP | 5874501 U | 5/1983 | |
| JP | H0453620 A | 2/1992 | |
| JP | 2010012582 A | 1/2010 | |
| WO | 2009049960 A2 | 4/2009 | |

OTHER PUBLICATIONS

Office Action from the Chinese Patent Office dated Mar. 4, 2016 in counterpart Chinese application No. 201410267587.2, and translation of substantive portions thereof.

Office Action from the Japanese Patent Office dated Aug. 8, 2017 in counterpart Japanese application No. 2014-080183, and machine translation thereof.

* cited by examiner

JIGSAW

CROSS-REFERENCE

This application claims priority to Japanese patent application no. 2013-129776 filed on Jun. 20, 2013, and to Japanese patent application no. 2014-080183 filed on Apr. 9, 2014, the contents of which are fully incorporated herein by reference.

TECHNICAL FIELD

The present disclosure relates to a jigsaw with a reciprocating blade that protrudes downwardly from a front part of a main body and a base that is configured to make contact with a workpiece. The base is coupled to a lower part of the main body.

BACKGROUND ART

In known jigsaws, such as the jigsaw disclosed in Japanese Unexamined Patent Application Publication No. 2010-12582, a reciprocating blade protrudes downwardly from a front part of a main body of the jigsaw. The jigsaw also includes a base configured to make contact with a workpiece, and the base is coupled to a lower part of the main body. The base has a rectangular shape in plan view, and the blade passes orthogonally through the plane of the base. The main body can be positioned by setting the base on the workpiece.

In light of the trend in recent years toward lightweight and compact configurations, based on consumer demand, the base of such jigsaws is usually made as small as possible. In other words, the dimension of the base in the left-right direction (e.g., the width of the base) is set in accordance with the width of the main body so that the base does not get in the way when, for example, a cut is being made near a wall or other structure, and the length in the front-rear direction is set such that the main body does not tip over.

The blade of such jigsaws, which is located frontward of the center of gravity of the jigsaw, moves reciprocatively in the up and down (vertical) direction. When cutting is performed, this reciprocal movement causes a repetitive, rotational urging or moment on the jigsaw in the forward and reverse directions about the center of gravity of the jigsaw and causes the jigsaw to rock back and forth in the front and rear directions. If the dimension of the base in the front-rear direction is small, it may be difficult to stabilize the jigsaw even if it is pressed down from above, and consequently there is a risk that the main body will generate a rattling vibration in the front-rear direction.

SUMMARY

Accordingly, one feature of the present disclosure is a jigsaw that exhibits reduced vibration during cutting and in which the attitude of a main body can be stabilized during cutting.

A first aspect of the disclosure is a jigsaw comprising a main body that includes a grasping part, a blade that projects downwardly from a front part of the main body and is configured to move reciprocatively up and down (vertically), and a base that is coupled to a lower part of the main body and that is configured to make contact with a workpiece. A rear end of a contact surface (which is the surface that makes contact with the workpiece) can be positioned so that it coincides with, or is rearward of, the rear end of the grasping part in the front-rear direction.

According to a second aspect of the disclosure, the contact surface is a lower surface of the base, and the mounting position of the base in the front-rear direction relative to the main body can be changed. In addition, the rear end of the base is positioned so that it always coincides with, or is rearward of, the rear end of the grasping part.

According to a third aspect of the disclosure, a left-right width of the rear end of the base is smaller than a left-right width of a front end of the base.

According to a fourth aspect of the disclosure, ribs are provided that extend from the front end to the rear end of the base, either continuously or discontinuously.

According to a fifth aspect of the disclosure, the ribs are provided at both the left and right sides of the base.

According to a sixth aspect of the disclosure, a distance from the rear end of the base to a coupling part that couples the main body and the base is two or more times greater than a distance from the coupling part to a front end of the blade.

According to a seventh aspect of the disclosure, the surface area of the base in plan view is greater than the surface area of the main body in plan view.

According to an eighth aspect of the disclosure, a resin plate, which is configured to make contact with the workpiece, is attached to the lower surface of the base.

According to a ninth aspect of the disclosure, the grasping part is a handle that is disposed above the main body and that extends in the front-rear direction.

According to a tenth aspect of the disclosure, a housing of the main body comprises a tubular motor housing that houses a motor so that the motor is oriented frontward, and the motor housing comprises the grasping part.

According to an eleventh aspect of the disclosure, the base can be tilted to the left and to the right and can be fixed at an arbitrary angle relative to the main body.

A twelfth aspect of the disclosure is a jigsaw that comprises a main body, a blade that protrudes downwardly from a front part of the main body and that is configured to move reciprocatively up and down (vertically), and a base that is coupled to a lower part of the main body. The base is configured to make contact with a workpiece, and a mount position of the base in the front-rear direction with respect to the main body can be changed. Furthermore, a front-rear distance from a front end of the blade to a rear end of the base is always 145 mm or greater.

According to a thirteenth aspect of the disclosure, a left-right width of the rear end of the base is smaller than a left-right width of the front end of the base.

According to a fourteenth aspect of the disclosure, ribs are provided that extend from the front end to the rear end of the base.

According to a fifteenth aspect of the disclosure, the ribs are provided at both the left and right sides of the base.

According to a sixteenth aspect of the disclosure, a distance from the rear end of the base to a coupling part that couples the main body and the base is two or more times greater than a distance from the coupling part to the front end of the blade.

According to a seventeenth aspect of the disclosure, the surface area of the base in plan view is greater than the surface area of the main body in plan view.

According to the first and twelfth aspects, vibration can be reduced and the attitude of the main body can be stabilized when cutting is performed. This helps make it possible to maintain cutting accuracy.

In addition, if the base is lengthened in the rearward direction, the configuration of the base contributes to the reduction of vibration.

In addition, reducing the rear end width of the base reduces the weight of the base even if the length of the base is increased. Such a configuration also reduces the risk of the rear end of the base getting in the way when the jigsaw is used to make a curved cut.

In addition, if ribs are provided on the base, the stiffness of the base is increased while the flexure (flexibility) of the base is decreased, and this helps to reduce vibration.

In addition, if the ribs are provided at both left and right sides of the base, the stiffness of the base will be improved while maintaining a compact configuration.

In addition, setting the distance from the coupling part effectively reduces rattle in the base, further improving a vibration reduction effect.

In addition, making the surface area of the base in plan view larger than the surface area of the main body in plan view helps reduce or prevent rattle in the base, and this leads to an effective reduction in vibration.

DETAILED DESCRIPTION

Embodiments of the present disclosure are described below, with reference to the accompanying drawings.

Figure 1:
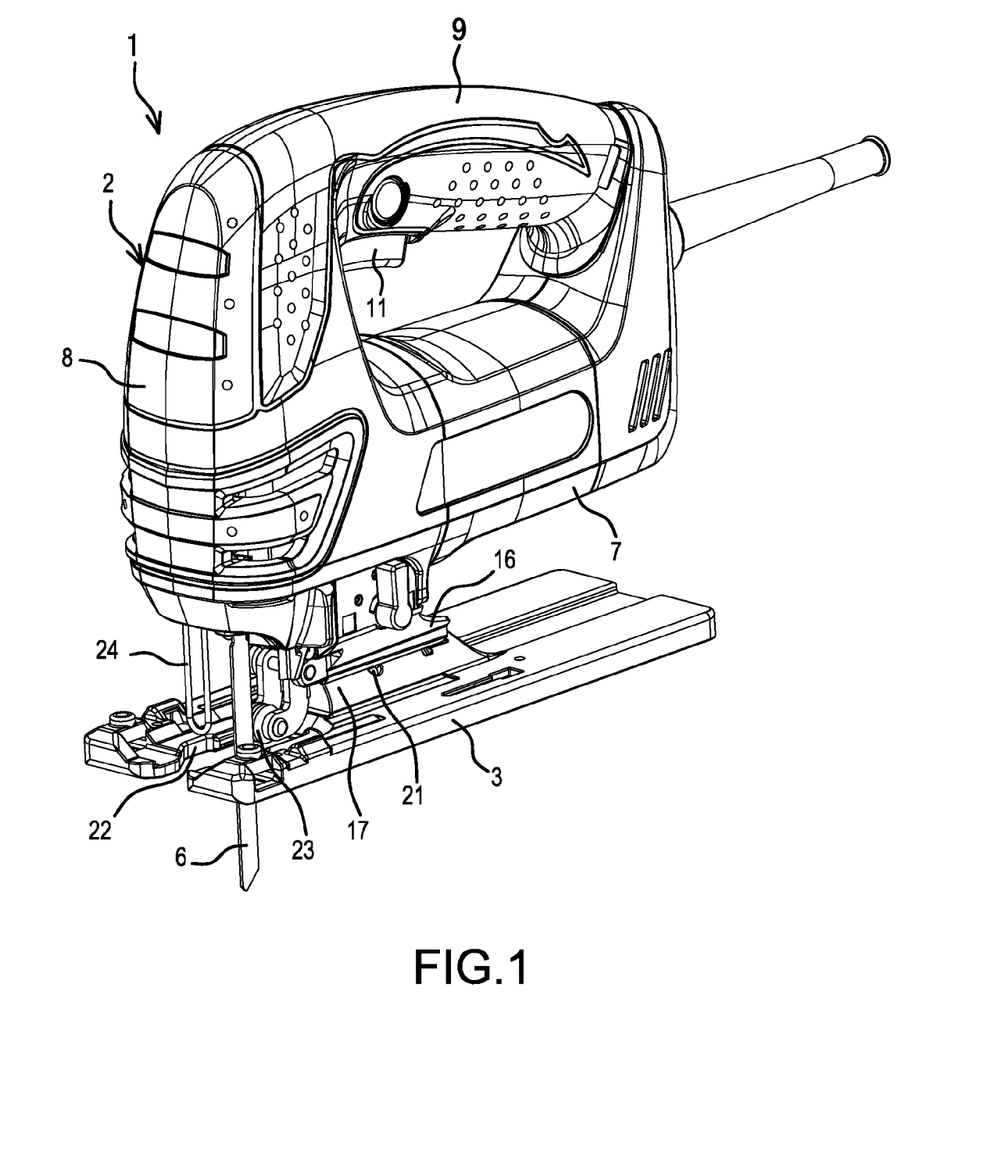
FIG. 1 is an oblique view of a jigsaw according to an embodiment of the disclosure.
Figure 2:
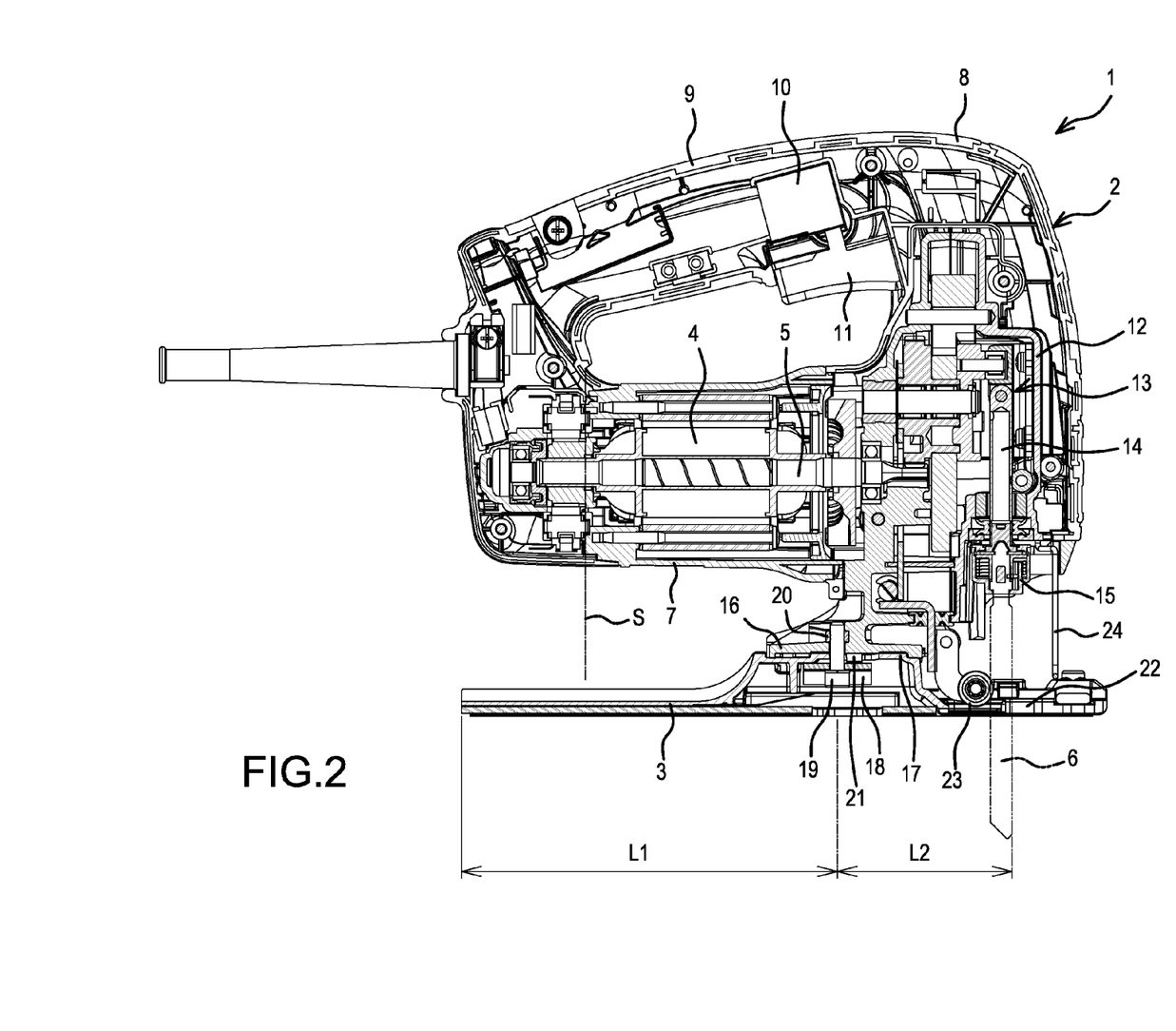
FIG. 2 is a longitudinal cross sectional view of the jigsaw of FIG. 1.

FIG. 1 and FIG. 2 illustrate a jigsaw 1 that includes a base 3 (the lower left side in FIG. 1 and the right side in FIG. 2 are the front or frontward portions of the jigsaw 1). The base 3 is disposed at a lower part of the jigsaw 1 and is rectangular in plan view. A blade 6 protrudes downwardly from a front part of a main body 2 of the jigsaw, and a motor 4 is installed (housed) in the main body 2. A generally tubular motor housing 7 of the main body 2 houses the motor 4 such that the motor is oriented frontward. A main body housing 8 of the main body 2 is generally shaped like an inverted U, and the two ends of the U are coupled to the front and rear of the motor housing 7, respectively. The main body housing 8 may be formed, for example, by screwing together a pair of left and right half-split housings.

A handle 9 extends in the front-rear direction and serves as a grasping part. The handle 9 is formed above the motor housing 7 in the main body housing 8. A switch 10, from which a trigger 11 protrudes downwardly, is housed inside the handle 9 on the front side thereof. Furthermore, a gear housing 12 is provided on the front side of the main body housing 8, and a motion converting mechanism 13 for converting the rotation of an output shaft 5 of the motor 4 to a reciprocating linear motion of a rod 14 is housed inside the gear housing 12. The blade 6 is detachably coupled to a lower end of the rod 14 via a holder (chuck) 15.

A bulging portion 17 in the center of an upper surface of the base 3 is in contact with a curved plate part 16 that protrudes downwardly from the main body housing 8 at a lower end of the main body housing 8. The base 3 is coupled to the curved plate part 16 by a bolt 19 that passes through the bulging portion 17 from below through a spacer 18 and into a nut 20, which nut 20 is held by the curved plate part 16. A through hole 21 of the bolt 19 in the bulging portion 17 has a cross shape in a plan view; therefore, if the bolt 19 is loosened, the base 3 can be slid frontward and rearward within the range in which the bolt 19 moves relatively inside the through hole 21. This movement allows the base 3 to be fixed at an arbitrary front-rear position relative to the main body 2. The base 3 can also be tilted to the left and right, and thus fixed at an arbitrary angle relative to the main body 2. A notched recessed part 22, through which the blade 6 passes orthogonally, is provided in the base 3 frontward of the bulging portion 17. A back roller 23 is located rearward of the blade 6 so that it protrudes downwardly from the gear housing 12 to make contact with a rear end of the blade 6 and guards the blade 6. A guard frame 24 is provided frontward of the blade 6 and protrudes downward from the gear housing 12.

Figure 3:
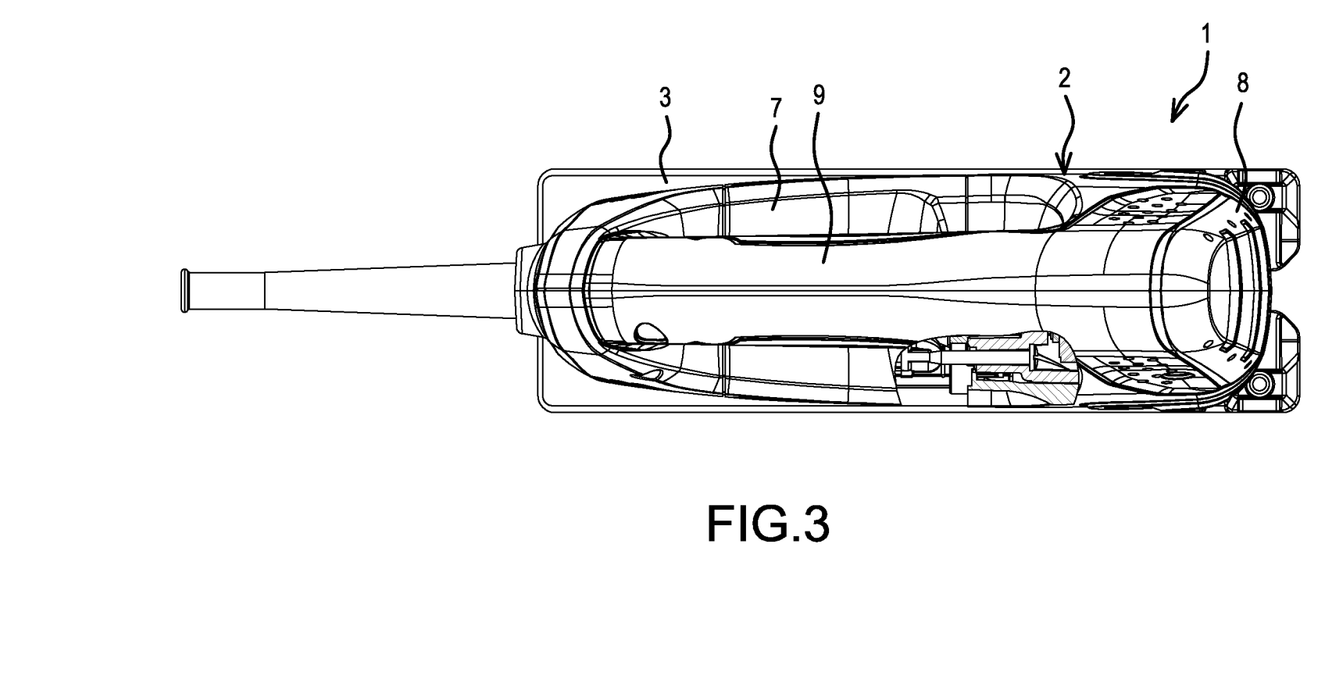
FIG. 3 is a plan view of the jigsaw of FIG. 1.

Furthermore, as shown in FIG. 3, the area of the base 3 in plan view is larger than the area of the main body 2 in plan view. In addition, the base 3 has a left-right width that is substantially the same as the left-right width of the main body 2. Also, when the base 3 is positioned in its most frontward position relative to the curved plate part 16, a front end of the base 3 is located slightly frontward of a front end of the main body 2, and a rear end of the base 3 is at substantially the same location as the rear end of the main body 2. With this configuration, regardless of whether the base 3 is at its front-most location or its rear-most location, the rear end of the base 3 is located rearward of a rear end position S of the handle 9 shown in FIG. 2. In other words, a lower surface of the base 3, which is a contact surface, extends rearward of the rear end position S of the handle 9.

Furthermore, in the configuration illustrated in FIGS. 2 and 3, a distance L1 from the center of the bolt 19 (a coupling part between the main body 2 and the base 3) to the rear end of the base 3 is two or more times greater than a distance L2 from the center of the bolt 19 to the front end of the blade 6.

The jigsaw 1 may be used by grasping the handle 9 and setting the base 3 on the upper surface of a workpiece to be cut. The trigger 11 is depressed (squeezed) to turn the switch 10 ON and drive the motor 4 and thereby rotate the output shaft 5. This causes the rod 14 to reciprocally move up and down via the motion converting mechanism 13 and the blade 6 to move in a reciprocating manner so that the workpiece can be cut if the main body 2 is advanced along the workpiece.

When cutting is performed, the reciprocating motion of the blade 6 causes a rotational urging or moment on the jigsaw 1 about its center of gravity which urging switches back and forth between forward and rearward directions. In a conventional jigsaw, this rotational moment would cause entire power tool 1 to rock back and forth in the front and rear direction during use. However, in the present embodiment, the length of the base 3 is long enough that it protrudes (extends) rearward of the rear end position S of the handle 9. Therefore, pressing down on the handle 9 effectively reduces this back and forth urging, thereby reducing the longitudinal rattle or vibration of the jigsaw 1.

Thus, according to the jigsaw 1 of the above-described embodiment, the rear end of the contact surface (here, the rear end of the base 3) can be located, in the front-rear direction, rearward of the rear end of the handle 9, and this makes it possible to reduce vibrations and to stabilize the attitude of the main body 2 during cutting.

Because the rearmost portion of the rear end of the base 3 is located rearward of the rear end of the handle 9, vibration can be easily reduced using the base 3.

In addition, because the distance L1 from the center of the bolt 19 (which couples the main body 2 and the base 3) to the rear end of the base 3 is two or more times greater than the distance L2 from the center of the bolt 19 to the front end of the blade 6, rattling of the base 3 is effectively reduced. This aspect of the design thus also contributes to an improvement in the vibration reduction effect.

Furthermore, making the surface area of the base 3 in plan view greater than the surface area of the main body 2 in plan view satisfactorily reduces or prevents the rattle of the base 3. This aspect of the design thus also effectively contributes to reducing vibration.

Furthermore, in the above-described embodiment, the rear end of the base 3 is always located rearward of the rear end position S of the handle 9, but the rear end of the base 3 may be made to coincide with (be even or aligned with) the rear end position S of the handle 9. In such a case, the rear end of the base 3 when it is at its rearmost position should coincide with the rear end position S of the handle 9.

In addition, setting the distance L1 to be two or more times the distance L2 and making the surface area of the base 3 in plan view larger than the surface area of the main body 2 in plan view are not both essential; it is also possible, for example, to adopt a configuration wherein just one or neither one of these conditions applies.

Figure 4:
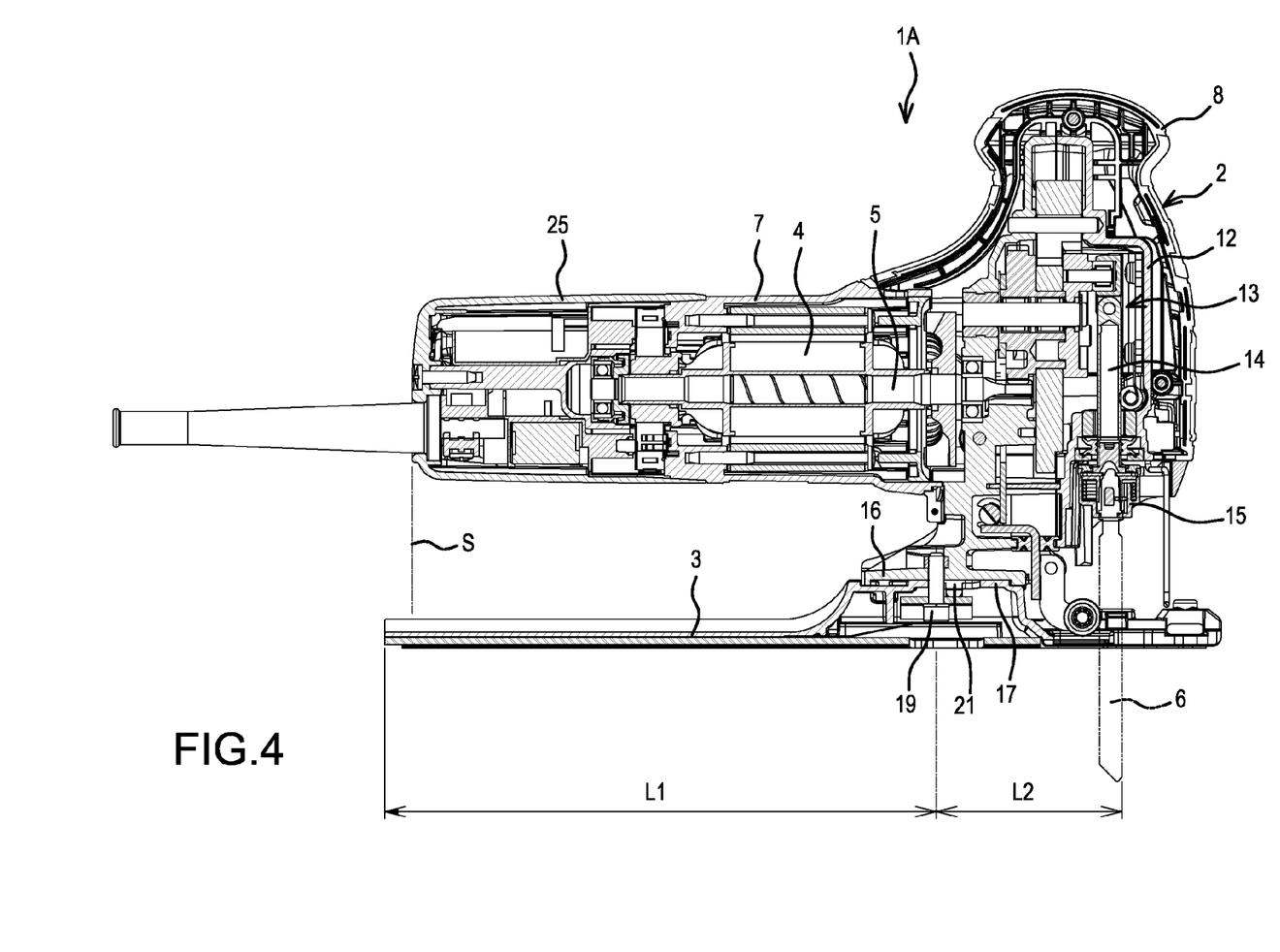
FIG. 4 is a longitudinal cross sectional view of a jigsaw according to another embodiment.

Furthermore, the abovementioned embodiment describes a jigsaw in which the handle 9 is formed above the motor 4; however, as shown in FIG. 4, the present concept can also be implemented in a type of jigsaw 1A wherein the main body housing 8 is formed only (completely) frontward of the motor 4 and, instead of having a handle above the motor 4, the motor housing 7 itself is used (serves) as the grasping part (sometimes referred to as a body handle). However, in this configuration, a rear housing 25, which has a bottomed tubular shape, is coaxially coupled to the rear end of the motor housing 7. The grasping part is formed by the combination of the motor housing 7 and the rear housing 25 and consequently, the base 3 protrudes rearward of the rear end position S of the rear housing 25 (alternatively, the rear end position S and the rear end of the base 3 may coincide, i.e. be aligned). Accordingly, if the grasping part is formed by the motor housing 7 alone and not by the rear housing 25, then the base 3 should protrude rearward of the rear end position of the motor housing 7 (alternatively, the rear end position and the rear end of the base 3 should coincide). This configuration also reduces vibration during cutting and stabilizes the attitude of the main body 2. Furthermore, in the embodiment of FIG. 4, two conditions may be satisfied, namely, the distance L1 from the center of the bolt 19 to the rear end of the base 3 may be two or more times greater than the distance L2 from the center of the bolt 19 to the front end of the blade 6, and/or the surface area of the base 3 in plan view may be larger than the surface area of the main body 2 in a plan view; however, while satisfying one or both of these conditions may provide benefits, it is not necessary that either one of these conditions be satisfied.

Figure 5A:
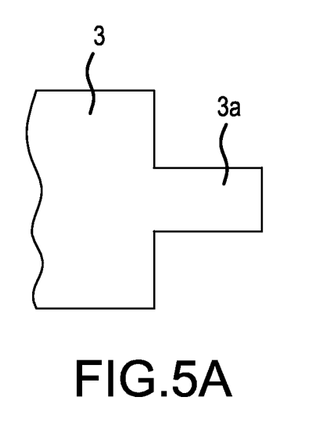
FIGS. 5(A), (B), and (C) are plan views of three configurations for a rear end portion of a base suitable for use with the jigsaw of FIG. 1.
Figure 5B:
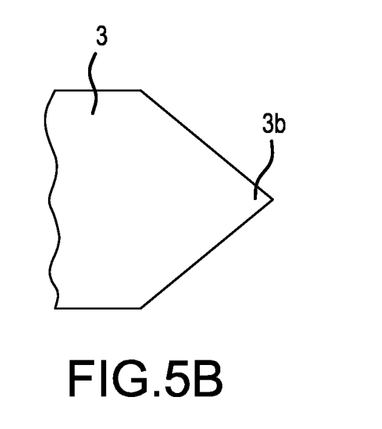
Figure 5C:
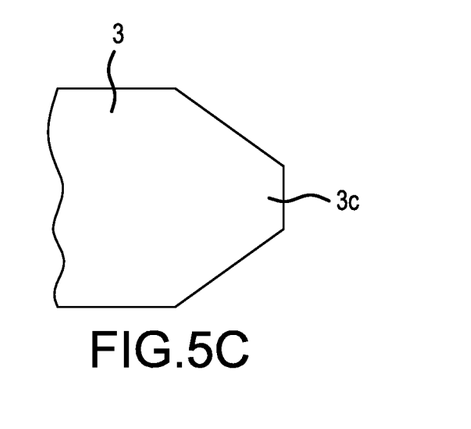

Moreover, the width of the base 3 does not necessarily have to be constant in the front to rear direction. For example, as shown in FIG. 5(A), the rear end of the base 3 may have a convex shape so that only a center part 3a protrudes to or rearward of the rear end position S of the grasping part. Also, as shown in FIG. 5(B), the rear end may have a triangular shape so that only a tip part 3b protrudes to or rearward of the rear end position S of the grasping part. FIG. 5(C) shows that the rear end alternately may have a generally trapezoidal shape so that only a tip part 3c protrudes to or rearward of the rear end position S of the grasping part.

These configurations reduce the weight of the base 3 even though its length is increased. In addition, the rear end of the base 3 is less likely to get in the way when the jigsaw 1 is used to cut a curve.

Furthermore, in the above-described embodiments and modified examples, the contact surface of the base 3 is located at the same position as, or rearward of, the rear end position S of the grasping part; however, the contact surface is not limited to a portion of the base 3. For example, it is also conceivable that a portion of the main body housing 8, the motor housing 7, and the like rearward of the base 3 protrudes downward and has a lower surface that is flush with the lower surface of the base 3, thereby forming a contact surface that is located at a position that coincides with, or is rearward of, the rear end position S of the grasping part.

Figure 6:
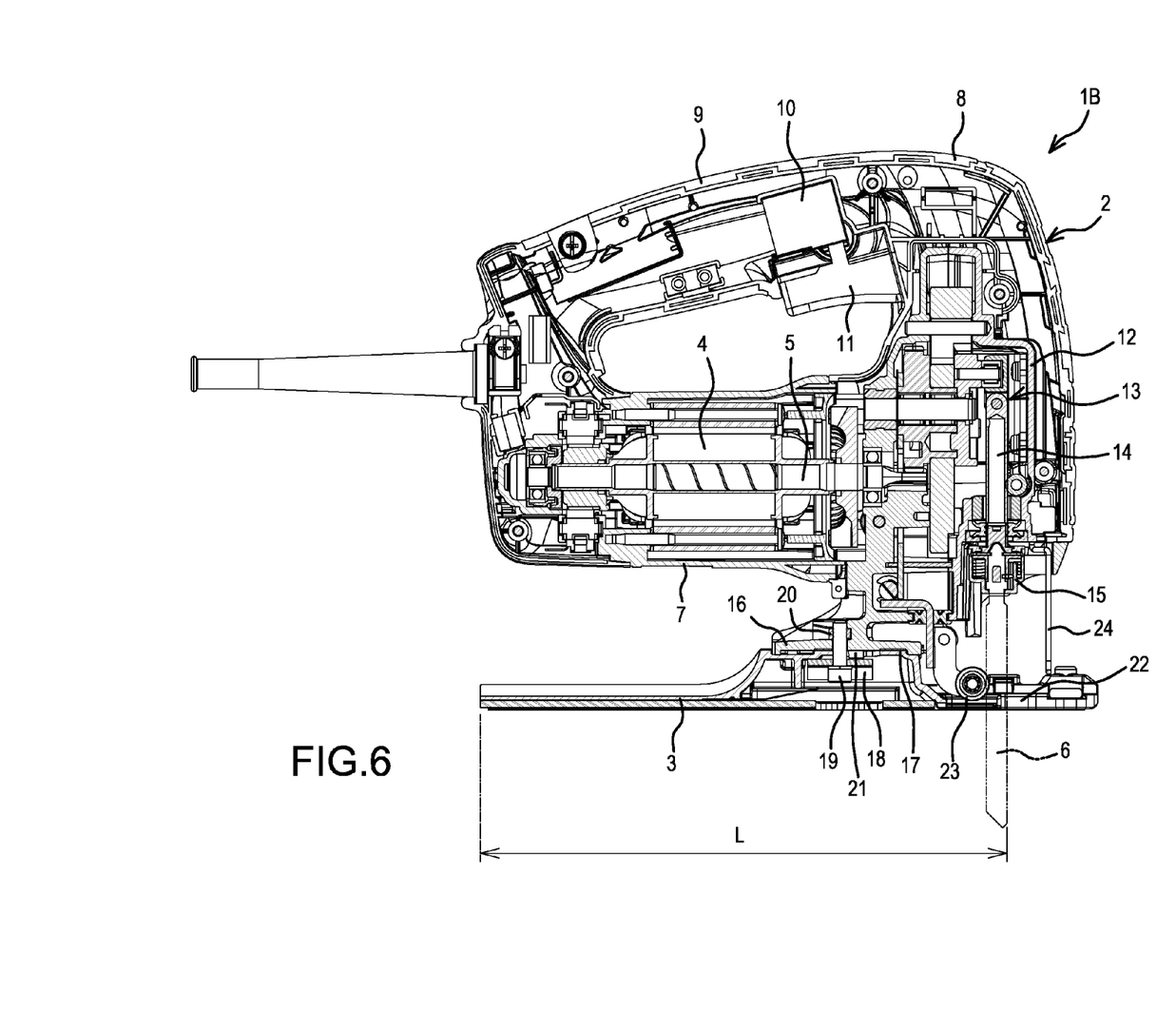
FIG. 6 is a longitudinal cross sectional view of a jigsaw according to another embodiment.

In addition, the present disclosure is not limited to setting the length of the base 3 relative to the rear end position S of the grasping part. In the jigsaw 1B shown in FIG. 6, for example, even if the length of the base 3 is set such that a distance L from the front end of the blade 6 to the rear end of the base 3 is always 145 mm or greater, vibration during cutting can be reduced, and the attitude of the main body 2 can be stabilized. Likewise, in the body handle type of jigsaw 1A shown in FIG. 4, the rear end shape of the base 3 can be modified as shown in FIG. 5. In addition, as in the previous embodiment, vibration can be effectively reduced or prevented if the distance from the center of the bolt 19 to the rear end of the base 3 is set to be two or more times greater than the distance from the center of the bolt 19 to the front end of the blade 6, and/or if the surface area of the base 3 in plan view is set to be larger than the surface area of the main body 2 in plan view, and the like.

Figure 7A:
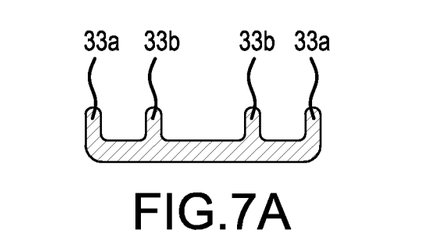
FIGS. 7(A) and (B) are transverse cross sectional views of a jigsaw base suitable for use with a jigsaw.

Furthermore, in each of the above-described embodiments, the base 3 may be configured such that, as shown in FIG. 7(A), two outer ribs 33a are provided at both left and right sides of the base 3 which outer ribs 33a are upright and extend from the front end to the rear end of the base 3. Two inner ribs 33b may also provided at a prescribed spacing from the outer ribs 33a. The inner ribs 33b are also upright and extend from the front end to the rear end of the base 3. If such outer ribs 33a and inner ribs 33b are provided, then the stiffness of the base 3 is increased, flexure is decreased, and vibration is thereby effectively reduced. The number of ribs can be increased or decreased as appropriate, and, depending on the shape of the base, the inner ribs 33b may be formed intermittently (discontinuously); however, if ribs are provided at least at both the left and right sides of the base 3, the stiffness of the base 3 should be improved while maintaining a compact configuration.

Figure 7B:
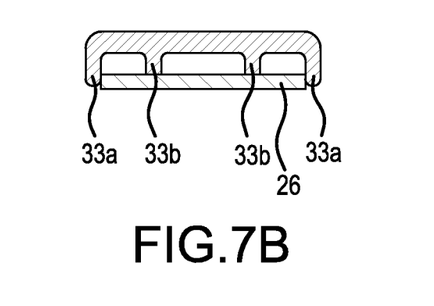

Moreover, the orientation of the ribs is not limited to projecting upward; for example, as shown in FIG. 7(B), ribs can instead be provided that are oriented downward; however, here, the height of the inner ribs 33b is less than that of the outer ribs 33a, and a plate 26, which is made of resin and whose lower surface is located downward of the lower ends of the outer ribs 33a, is attached between the outer ribs 33a. The presence of the plate 26 improves the sliding characteristics of the base 3 with respect to the workpiece and substantially prevents the base 3 from sticking to the surface of the workpiece and being lifted upward. Therefore, the use of the plate 26 also leads to a reduction in vibration; however, the plate 26 is optional and can be omitted.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved jig saws.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF SYMBOLS 1, 1A, 1B Jigsaws
2 Main body
3 Base
3a Center part
3b Tip part
3c Tip part
4 Motor
5 Output shaft
6 Blade
7 Motor housing
8 Main body housing
9 Handle
12 Gear housing
13 Converter mechanism
14 Rod
26 Plate
33a Outer rib
33b Inner rib

The invention claimed is:

1. A jigsaw, comprising:
a main body including a grasping part configured to be grasped by a user;
a blade projecting downwardly from a front part of the main body and configured to reciprocate in an up-down direction; and
a base coupled to a lower part of the main body, a lower surface of the base comprising a planar contact surface having a front end and a rear end and parallel lateral sides, the planar contact surface being configured to make contact with a workpiece and being free of projections;
wherein, the rear end of the planar contact surface is located at a position that coincides with, or is rearward of, a rear end of the grasping part, and
a back portion of the planar contact surface extends rearward from the parallel lateral sides to the rear end of the planar contact surface and is substantially triangular or is substantially trapezoidal or comprises first and second walls extending inwardly from and perpendicular to the parallel lateral sides and a finger having parallel lateral sides extending from the first and second walls.

2. The jigsaw according to claim 1, wherein:
the base is substantially flat;
the front end of the planar contact surface and the rear end of the planar contact surface are configured to make sliding contact with the workpiece while the blade reciprocates;
a position of the base in a front-rear direction can be changed relative to the main body; and
a rearmost portion of the rear end of the base is located at a position that coincides with, or is rearward of, the rear end of the grasping part.

3. The jigsaw according to claim 2, wherein a left-right width of the rear end of the planar contact surface is smaller than a left-right width of the front end of the planar contact surface.

4. The jigsaw according to claim 2, including ribs extending from a front end to a rear end of the base.

5. The jigsaw according to claim 4, wherein the ribs are provided at least at left and right sides of the base.

6. The jigsaw according to claim 4, wherein a distance from the rear end of the base to a coupling part that couples the main body and the base is two times greater than a distance from the coupling part to a front end of the blade.

7. The jigsaw according to claim 2, wherein a surface area of the base in plan view is greater than a surface area of the main body in plan view.

8. The jigsaw according to claim 2, wherein the base is tiltable to the left and to the right and is fixable at an arbitrary angle relative to the main body.

9. The jigsaw according to claim 1, wherein the grasping part is a handle disposed above the main body and extending in a front-rear direction that is perpendicular to up-down direction.

10. The jigsaw according to claim 1, wherein:
a housing of the main body comprises a tubular motor housing that houses a motor oriented frontward; and
the grasping part comprises the motor housing.

11. The jigsaw according to claim 1, wherein the back portion of the planar contact surface is substantially triangular.

12. The jigsaw according to claim 1, wherein the back portion of the planar contact surface is substantially trapezoidal.

13. The jigsaw according to claim 1, wherein the back portion of the planar contact surface comprises first and second walls extending inwardly from and perpendicular to the parallel lateral sides and a finger having parallel lateral sides extending from the first and second walls.

14. A jigsaw, comprising:
a main body including a grasping part configured to be grasped by a user;

a blade projecting downwardly from a front part of the main body and configured to reciprocate in an up-down direction; and a base coupled to a lower part of the main body, a lower surface of the base comprising a planar contact surface configured to make contact with a workpiece, the planar contact surface being free of projections;

wherein:

a rear end of the contact surface is located at a position that coincides with, or is rearward of, the rear end of the grasping part;

the base is substantially flat;

a front portion of the contact surface and a rear portion of the contact surface are configured to make sliding contact with the workpiece while the blade reciprocates;

the base includes first and second longitudinally extending laterally outer ribs each having a bottom edge and a first height, at least one longitudinally extending inner rib between the first and second outer ribs having a bottom edge and a second height less than the first height;

a resin plate having a bottom surface configured to make contact with the workpiece is attached to the bottom of the at least one inner rib between the first and second outer ribs; and the bottoms of the first and second outer ribs are spaced from a plane of the bottom surface of the resin plate.

* * * * *